United States Patent [19]
Adiwoso et al.

[11] Patent Number: 6,067,453
[45] Date of Patent: *May 23, 2000

[54] SATELLITE-BASED DIRECT ACCESS TELECOMMUNICATIONS SYSTEMS

[75] Inventors: Adi R. Adiwoso; Stuart C. Taylor; Kevin B. Smyth, all of Jakarta, Indonesia

[73] Assignee: PT Pasifik Satelit Nusantara, Jakarta, Indonesia

[*] Notice: This patent is subject to a terminal disclaimer.

[21] Appl. No.: 08/740,271

[22] Filed: Oct. 25, 1996

[51] Int. Cl.⁷ .............................. H04B 7/185; H04B 7/19; H04Q 7/20

[52] U.S. Cl. .................. 455/430; 455/428; 455/13.1; 455/12.1

[58] Field of Search .................... 455/13.1, 428, 455/430, 429, 12.1, 13.3, 13.4, 450; 342/350, 352, 367

[56] References Cited

U.S. PATENT DOCUMENTS

| | | | |
|---|---|---|---|
| 4,261,054 | 4/1981 | Scharla-Nielsen | 455/13.4 |
| 4,455,651 | 6/1984 | Baran | 455/13.1 |
| 4,724,439 | 2/1988 | Wiley et al. | 342/351 |
| 5,067,672 | 11/1991 | Bouzat | 244/158 |
| 5,163,160 | 11/1992 | Foucher et al. | 455/76 |
| 5,279,483 | 1/1994 | Blancke et al. | 244/165 |
| 5,410,728 | 4/1995 | Bertiger et al. | 455/13.1 |
| 5,433,726 | 7/1995 | Horstein et al. | 244/158 |
| 5,439,190 | 8/1995 | Horstein et al. | 244/158 R |
| 5,471,641 | 11/1995 | Dosiere et al. | 455/13.1 |
| 5,479,136 | 12/1995 | Endo et al. | 331/2 |
| 5,485,170 | 1/1996 | McCarrick | 343/895 |
| 5,508,932 | 4/1996 | Anchkar et al. | 364/459 |
| 5,612,701 | 3/1997 | Diekelman | 342/352 |
| 5,699,355 | 12/1997 | Natarajan | 370/322 |
| 5,754,942 | 5/1998 | Wachs | 455/13.4 |
| 5,793,813 | 8/1998 | Cleave | 375/259 |
| 5,818,396 | 10/1998 | Anderson et al. | 343/786 |
| 5,839,053 | 11/1998 | Bosch et al. | 455/13.1 |
| 5,842,125 | 11/1998 | Modzelesky et al. | 455/426 |
| 5,963,862 | 10/1999 | Adiwoso et al. | 455/430 |

FOREIGN PATENT DOCUMENTS

WO 96/08877  3/1996  WIPO.

OTHER PUBLICATIONS

*PCT International Search Report*, 4 pages, PCT/IB 97/01248, dated Apr. 17, 1998, Authorized Officer, Bischof, J–L.

C. Marel: "*VSAT networks*", Jan. 1996, John Wiley, Chichester, UK; XP002059665, pp. 1–47.

W. Ivancic, et al.: "A network Architecture for a Geostationary Communication Satellite", IEEE Communications Magazine, vol. 32, No. 7, Jul. 1994, NewYork, US, pp. 72–84.

Abdul Hamid Rana: "*VSAT–Enhanced ISDN: Architectures and Implementation*" IEEE Journal on selected areas in communications, vol. 10, No. 6, Aug., 1992, pp. 1081–1093, XP000296623.

W. Ivanic et al.: "A Network Architecture for a Geostationary Communication Satellite", IEEE Communications Magazine, Jul. 1994.

B. Setiawan: "The Next Generation of Palapa Satellite (Palpa–C)", The 1992 United Nations Workshop on Space Communication for Development: Proceedings pp. 263–274, 1992.

*Primary Examiner*—Dwayne D. Bost
*Assistant Examiner*—Raymond B. Persino
*Attorney, Agent, or Firm*—Blakely, Sokoloff, Taylor & Zafman, LLP

[57] ABSTRACT

A direct-access satellite telecommunications system employs one or more telecommunications satellites in geosynchronous orbit. Small, low-cost user terminals are located at the user's premises and permit two-way telecommunications via user links. Access links provide satellite telecommunications to larger gateway stations as well as a network control center. Gateway stations store user information and provide connection to terrestrial telecommunications networks. In operation, the network control center allocates satellite bandwidth and power to setup the access and user links, with a minority of the satellite's power being allocated to the access links, and a majority of the power being available for the user links.

22 Claims, 14 Drawing Sheets

FIG. 3

| Polarization | 1 | | | | | | | | 2 | | | | | | | | 1 | | | | | | | 2 | | | | | |
|---|---|---|---|---|---|---|---|---|---|---|---|---|---|---|---|---|---|---|---|---|---|---|---|---|---|---|---|---|---|
| Transponder | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| Channel | 1H | 2H | 3H | 4H | 5H | 6H | 7H | 8H | 1V | 2V | 3V | 4V | 5V | 6V | 7V | 8V | 1H | 2H | 3H | 4H | 5H | 6H | 1V | 2V | 3V | 4V | 5V | 6V |
| Indonesia | x | x | x | x | x | x | | | | | | | | | | | | | | | | | | | | | | |
| India | x | x | x | x | x | x | | | | | | | | | | | | | | | | | | | | | | |
| Philippines | x | x | x | x | x | x | | | | | | | | | | | | | | | | | | | | | | |
| Japan/Korea | x | x | x | x | x | x | | | | | | | | | | | | | | | | | | | | | | |
| Indonesia | | | | | | | | | x | x | x | x | x | x | | | x | x | x | x | x | x | | | | | | |
| China | | | | | | | | | x | x | x | x | x | x | | | x | x | x | x | x | x | | | | | | |
| Thailand | | | | | | | | | x | x | x | x | x | x | | | x | x | x | x | x | x | | | | | | |
| Australia | | | | | | | | | x | x | x | x | x | x | | | x | x | x | x | x | x | | | | | | |
| Asia | | | | | | | x | x | | | | | | | x | x | | | | | | | x | x | x | x | x | x |

FIG. 10A

Vertically Polarized Uplink Channels

| Ch. | Trans-ponder No. | Uplink Center Freq., MHz | BW, MHz | Channel Low Edge, MHz | Channel High Edge, MHz | Guard Band, MHz |
|---|---|---|---|---|---|---|
| EDGE | | | | | 6425.0 | 2.0 |
| 1EH | 1 | 6445.0 | 36 | 6427.0 | 6463.0 | 4.0 |
| 2EH | 2 | 6485.0 | 36 | 6467.0 | 6503.0 | 4.0 |
| 3EH | 3 | 6525.0 | 36 | 6507.0 | 6543.0 | 4.0 |
| 4EH | 4 | 6565.0 | 36 | 6547.0 | 6583.0 | 4.0 |
| 5EH | 5 | 6605.0 | 36 | 6587.0 | 6623.0 | 4.0 |
| 6EH | 6 | 6645.0 | 36 | 6627.0 | 6663.0 | 4.0 |
| 1EH | 17 | 6445.0 | 36 | 6427.0 | 6463.0 | 4.0 |
| 2EH | 18 | 6485.0 | 36 | 6467.0 | 6503.0 | 4.0 |
| 3EH | 19 | 6525.0 | 36 | 6507.0 | 6543.0 | 4.0 |
| 4EH | 20 | 6565.0 | 36 | 6547.0 | 6583.0 | 4.0 |
| 5EH | 21 | 6605.0 | 36 | 6587.0 | 6623.0 | 4.0 |
| 6EH | 22 | 6645.0 | 36 | 6627.0 | 6663.0 | 4.0 |
| 7EH | 7 | 6680.5 | 27 | 6667.0 | 6694.0 | 4.0 |
| 8EH | 8 | 6711.5 | 27 | 6698.0 | 6725.0 | 0.0 |
| EDGE | | | | 6725.0 | | |

Horizontally Polarized Uplink Channels

| Ch. | Trans-ponder No. | Uplink Center Freq., MHz | BW, MHz | Channel Low Edge, MHz | Channel High Edge, MHz | Guard Band, MHz |
|---|---|---|---|---|---|---|
| EDGE | | | | | 6425.0 | 2.0 |
| 1EV | 9 | 6445.0 | 36 | 6427.0 | 6463.0 | 4.0 |
| 2EV | 10 | 6485.0 | 36 | 6467.0 | 6503.0 | 4.0 |
| 3EV | 11 | 6525.0 | 36 | 6507.0 | 6543.0 | 4.0 |
| 4EV | 12 | 6565.0 | 36 | 6547.0 | 6583.0 | 4.0 |
| 5EV | 13 | 6605.0 | 36 | 6587.0 | 6623.0 | 4.0 |
| 6EV | 14 | 6645.0 | 36 | 6627.0 | 6663.0 | 4.0 |
| 1EV | 23 | 6445.0 | 36 | 6427.0 | 6463.0 | 4.0 |
| 2EV | 24 | 6485.0 | 36 | 6467.0 | 6503.0 | 4.0 |
| 3EV | 25 | 6525.0 | 36 | 6507.0 | 6543.0 | 4.0 |
| 4EV | 26 | 6565.0 | 36 | 6547.0 | 6583.0 | 4.0 |
| 5EV | 27 | 6605.0 | 36 | 6587.0 | 6623.0 | 4.0 |
| 6EV | 28 | 6645.0 | 36 | 6627.0 | 6663.0 | 4.0 |
| 7EV | 15 | 6680.5 | 27 | 6667.0 | 6694.0 | 4.0 |
| 8EV | 16 | 6711.5 | 27 | 6698.0 | 6725.0 | 0.0 |
| EDGE | | | | 6725.0 | | |

FIG. 10B

| Horizontally Polarized Downlink Channels | | | | | | | Vertically Polarized Downlink Channels | | | | | | |
|---|---|---|---|---|---|---|---|---|---|---|---|---|---|
| Ch. | | Downlink Center Freq., MHz | BW, MHz | Channel Low Edge, MHz | Channel High Edge, MHz | Guard Band, MHz | Ch. | | Downlink Center Freq., MHz | BW, MHz | Channel Low Edge, MHz | Channel High Edge, MHz | Guard Band, MHz |
| EDGE | | | | | 3400.0 | 2.0 | EDGE | | | | | 3400.0 | 2.0 |
| 1EH | 1 | 3420.0 | 36 | 3402.0 | 3438.0 | 4.0 | 1EV | 9 | 3420.0 | 36 | 3402.0 | 3438.0 | 4.0 |
| 2EH | 2 | 3460.0 | 36 | 3442.0 | 3478.0 | 4.0 | 2EV | 10 | 3460.0 | 36 | 3442.0 | 3478.0 | 4.0 |
| 3EH | 3 | 3500.0 | 36 | 3482.0 | 3518.0 | 4.0 | 3EV | 11 | 3500.0 | 36 | 3482.0 | 3518.0 | 4.0 |
| 4EH | 4 | 3540.0 | 36 | 3522.0 | 3558.0 | 4.0 | 4EV | 12 | 3540.0 | 36 | 3522.0 | 3558.0 | 4.0 |
| 5EH | 5 | 3580.0 | 36 | 3562.0 | 3598.0 | 4.0 | 5EV | 13 | 3580.0 | 36 | 3562.0 | 3598.0 | 4.0 |
| 6EH | 6 | 3620.0 | 36 | 3602.0 | 3638.0 | 4.0 | 6EV | 14 | 3620.0 | 36 | 3602.0 | 3638.0 | 4.0 |
| 1EH | 17 | 3420.0 | 36 | 3402.0 | 3438.0 | 4.0 | 1EV | 23 | 3420.0 | 36 | 3402.0 | 3438.0 | 4.0 |
| 2EH | 18 | 3460.0 | 36 | 3442.0 | 3478.0 | 4.0 | 2EV | 24 | 3460.0 | 36 | 3442.0 | 3478.0 | 4.0 |
| 3EH | 19 | 3500.0 | 36 | 3482.0 | 3518.0 | 4.0 | 3EV | 25 | 3500.0 | 36 | 3482.0 | 3518.0 | 4.0 |
| 4EH | 20 | 3540.0 | 36 | 3522.0 | 3558.0 | 4.0 | 4EV | 26 | 3540.0 | 36 | 3522.0 | 3558.0 | 4.0 |
| 5EH | 21 | 3580.0 | 36 | 3562.0 | 3598.0 | 4.0 | 5EV | 27 | 3580.0 | 36 | 3562.0 | 3598.0 | 4.0 |
| 6EH | 22 | 3620.0 | 36 | 3602.0 | 3638.0 | 4.0 | 6EV | 28 | 3620.0 | 36 | 3602.0 | 3638.0 | 4.0 |
| 7EH | 7 | 3655.5 | 27 | 3642.0 | 3669.0 | 4.0 | 7EV | 15 | 3655.5 | 27 | 3642.0 | 3669.0 | 4.0 |
| 8EH | 8 | 3686.5 | 27 | 3673.0 | 3700.0 | 0.0 | 8EV | 16 | 3686.5 | 27 | 3673.0 | 3700.0 | 0.0 |
| EDGE | | | | 3700.0 | | | | | | | | | |

FIG. 11A

| Vertically Polarized Uplink Channels | | | | | | | Horizontally Polarized Uplink Channels | | | | | | |
|---|---|---|---|---|---|---|---|---|---|---|---|---|---|
| Ch. | Trans. ponder No. | Uplink Center Freq., MHz | BW, MHz | Channel Low Edge, MHz | Channel High Edge, MHz | Guard Band, MHz | Ch. | Trans. ponder No. | Uplink Center Freq., MHz | BW, MHz | Channel Low Edge, MHz | Channel High Edge, MHz | Guard Band, MHz |
| EDGE | | | | | 7900.0 | 2.0 | EDGE | | | | | 7900.0 | 2.0 |
| 1EH | 1 | 7920.0 | 36 | 7902.0 | 7938.0 | 4.0 | 1EV | 9 | 7920.0 | 36 | 7902.0 | 7938.0 | 4.0 |
| 2EH | 2 | 7960.0 | 36 | 7942.0 | 7978.0 | 4.0 | 2EV | 10 | 7960.0 | 36 | 7942.0 | 7978.0 | 4.0 |
| 3EH | 3 | 8000.0 | 36 | 7982.0 | 8018.0 | 4.0 | 3EV | 11 | 8000.0 | 36 | 7982.0 | 8018.0 | 4.0 |
| 4EH | 4 | 8040.0 | 36 | 8022.0 | 8058.0 | 4.0 | 4EV | 12 | 8040.0 | 36 | 8022.0 | 8058.0 | 4.0 |
| 5EH | 5 | 8080.0 | 36 | 8062.0 | 8098.0 | 4.0 | 5EV | 13 | 8080.0 | 36 | 8062.0 | 8098.0 | 4.0 |
| 6-1EH | 6 or 17 | 8120.0 | 36 | 8102.0 | 8138.0 | 4.0 | 6-1EV | 14 or 23 | 8120.0 | 36 | 8102.0 | 8138.0 | 4.0 |
| 1-2EH | 17 or 18 | 8160.0 | 36 | 8142.0 | 8178.0 | 4.0 | 1-2EV | 23 or 24 | 8160.0 | 36 | 8142.0 | 8178.0 | 4.0 |
| 2-3EH | 18 or 19 | 8200.0 | 36 | 8182.0 | 8218.0 | 4.0 | 2-3EV | 24 or 25 | 8200.0 | 36 | 8182.0 | 8218.0 | 4.0 |
| 3-4EH | 19 or 20 | 8240.0 | 36 | 8222.0 | 8258.0 | 4.0 | 3-4EV | 25 or 26 | 8240.0 | 36 | 8222.0 | 8258.0 | 4.0 |
| 4-5EH | 20 or 21 | 8280.0 | 36 | 8262.0 | 8298.0 | 4.0 | 4-5EV | 26 or 27 | 8280.0 | 36 | 8262.0 | 8298.0 | 4.0 |
| 5-6EH | 21 or 22 | 8320.0 | 36 | 8302.0 | 8338.0 | 4.0 | 5-6EV | 27 or 28 | 8320.0 | 36 | 8302.0 | 8338.0 | 4.0 |
| 6EH | 22 | 8360.0 | 36 | 8342.0 | 8378.0 | 4.0 | 6EV | 28 | 8360.0 | 36 | 8342.0 | 8378.0 | 4.0 |
| 7EH | 7 | 8355.5 | 27 | 8342.0 | 8369.0 | | 7EV | 15 | 8355.5 | 27 | 8342.0 | 8369.0 | |
| FEH | | 8371.0 | 10 | 8366.0 | 8376.0 | | FEV | | 8371.0 | 10 | 8366.0 | 8376.0 | |
| 8EH | 8 | 8386.5 | 27 | 8373.0 | 8400.0 | 0.0 | 8EV | 16 | 8386.5 | 27 | 8373.0 | 8400.0 | 0.0 |
| EDGE | | | | 8400.0 | | | EDGE | | | | 8400.0 | | |

FIG. 11B

Horizontally Polarized Downlink Channels

| Ch. | | Downlink Center Freq., MHz | BW, MHz | Channel Low Edge, MHz | Channel High Edge, MHz | Guard Band, MHz |
|---|---|---|---|---|---|---|
| EDGE | | | | | 7250.0 | 2.0 |
| 1EH | 1 | 7270.0 | 36 | 7252.0 | 7288.0 | 4.0 |
| 2EH | 2 | 7310.0 | 36 | 7292.0 | 7328.0 | 4.0 |
| 3EH | 3 | 7350.0 | 36 | 7332.0 | 7368.0 | 4.0 |
| 4EH | 4 | 7390.0 | 36 | 7372.0 | 7408.0 | 4.0 |
| 5EH | 5 | 7430.0 | 36 | 7412.0 | 7448.0 | 4.0 |
| 6-1EH | 6 or 17 | 7470.0 | 36 | 7452.0 | 7488.0 | 4.0 |
| 1-2EH | 17 or 18 | 7510.0 | 36 | 7492.0 | 7528.0 | 4.0 |
| 2-3EH | 18 or 19 | 7550.0 | 36 | 7532.0 | 7568.0 | 4.0 |
| 3-4EH | 19 or 20 | 7590.0 | 36 | 7572.0 | 7608.0 | 4.0 |
| 4-5EH | 20 or 21 | 7630.0 | 36 | 7612.0 | 7648.0 | 4.0 |
| 5-6EH | 21 or 22 | 7670.0 | 36 | 7652.0 | 7688.0 | 4.0 |
| 6EH | 22 | 7710.0 | 36 | 7692.0 | 7728.0 | |
| 7F8 EH | 7,F,8 | 7721.0 | 58 | 7692.0 | 7750.0 | |
| EDGE | | | | 7750.0 | | |

Vertically Polarized Downlink Channels

| Ch. | | Downlink Center Freq., MHz | BW, MHz | Channel Low Edge, MHz | Channel High Edge, MHz | Guard Band, MHz |
|---|---|---|---|---|---|---|
| EDGE | | | | | 7250.0 | 2.0 |
| 1EV | 9 | 7270.0 | 36 | 7252.0 | 7288.0 | 4.0 |
| 2EV | 10 | 7310.0 | 36 | 7292.0 | 7328.0 | 4.0 |
| 3EV | 11 | 7350.0 | 36 | 7332.0 | 7368.0 | 4.0 |
| 4EV | 12 | 7390.0 | 36 | 7372.0 | 7408.0 | 4.0 |
| 5EV | 13 | 7430.0 | 36 | 7412.0 | 7448.0 | 4.0 |
| 6-1EV | 14 or 23 | 7470.0 | 36 | 7452.0 | 7488.0 | 4.0 |
| 1-2EV | 23 or 24 | 7510.0 | 36 | 7492.0 | 7528.0 | 4.0 |
| 2-3EV | 24 or 25 | 7550.0 | 36 | 7532.0 | 7568.0 | 4.0 |
| 3-4EV | 25 or 26 | 7590.0 | 36 | 7572.0 | 7608.0 | 4.0 |
| 4-5EV | 26 or 27 | 7630.0 | 36 | 7612.0 | 7648.0 | 4.0 |
| 5-6EV | 27 or 28 | 7670.0 | 36 | 7652.0 | 7688.0 | 4.0 |
| 6EV | 28 | 7710.0 | 36 | 7692.0 | 7728.0 | |
| 7F8 EV | 15,F,16 | 7721.0 | 58 | 7692.0 | 7750.0 | |
| EDGE | | | | 7750.0 | | |

SATELLITE-BASED DIRECT ACCESS TELECOMMUNICATIONS SYSTEMS

FIELD OF THE INVENTION

The present invention relates generally to the field of telecommunications systems; more particularly, the invention relates to satellite-based telecommunications systems providing a variety of multi-media services including voice, video, and data communications.

BACKGROUND OF THE INVENTION

Satellite telecommunication systems have been applied to a variety of commercial purposes over the past thirty years. These satellites first started out as low-power (e.g., several hundred watt) devices that required very powerful satellite Earth stations having antenna dishes on the order of 30 meters in diameter. A typical application in the earlier days of satellite communications was simple point-to-point trunking for public telephone companies.

Technology has progressed to the level where modern satellites are now highly sensitive devices which are capable of providing high-power transmissions. By way of example, today's satellites have power resources in the range of approximately 10–15 kilowatts. The development of more advanced satellites has lead to corresponding reductions in the size of Earth stations.

Advancements in satellite communication system technology have lead to the development of three basic categories, as defined by the International Telecommunications Union (ITU), of satellite services: fixed, mobile, and broadcast. Fixed systems, as the name implies, employ fixed or stationary terminals. Fixed systems have traditionally been utilized for point-to-point telecommunications trunking as part of public telephone networks, or for large private telecommunications networks. Since these types of communications tend to be reciprocal in nature, the same frequency and the same size terminal is normally used for both transmission and receiving of signals. Conventional fixed systems, therefore, typically utilize a single set of transmission channels (i.e., transponders). By way of example, U.S. Pat. No. 5,163,160 discloses a satellite transponder in which the transmitter is tuned to the same frequency as the local oscillator of the receiver. A frequency control circuit having a local oscillator applicable to the receiver of a satellite telecommunications apparatus is also described in U.S. Pat. No. 5,479,136.

Modern fixed satellite systems that provide two-way communications tend to be relatively expensive, highly application-specific systems. Due to these limitations, fixed, two-way satellite systems have generally been restricted to use by large corporations to provide data transmission, or by public telephone companies for basic trunking.

In mobile satellite systems, the user terminal can move from one location to another. An example of a mobile satellite system is the International Maritime Global Satellite (INMARSAT)™ system. Planned mobile cellular telephone satellite systems include Asia Cellular Satellite (ACeS)™, Iridium™, Globalstar™ and ICO Global™. Details of a mobile cellular telephone satellite system are disclosed in U.S. Pat. Nos. 5,433,726 and 5,439,190. A telecommunications network applicable to mobile terminals which employs a constellation of orbiting satellites placed in low-altitude polar inclined orbits is described in U.S. Pat. No. 5,471,641. U.S. Pat. No. 5,485,170 discloses a terminal suitable for use in a mobile telecommunication system.

A major problem associated with mobile systems is the limitation on capacity. Mobile systems are limited as to the number of users that they can accommodate, largely because the available bandwidth is restricted by international regulations.

Broadcast satellite systems are in service today across many parts of Europe, North America and Asia. They typically provide television broadcast services to receive-only subscriber terminals which employ small antennas limited in use for signal reception. Although broadcast systems are becoming ubiquitous throughout many regions of the world, they suffer the drawback of only providing one-way telecommunication service. In other words, the subscriber terminals are incapable of transmitting signals back to the broadcasting satellite. This means that any requests or other signaling initiated by the end-users must take place through ordinary terrestrial telecommunication lines.

Thus, there is a strong need for a satellite-based telecommunications system that can provide increased and improved services—well beyond the capabilities of present fixed, mobile, and broadcast satellite systems—to serve the mass public market. Instead of simple one-way broadcasting, the general public has a need for two-way multi-media services.

As will be seen, the present invention is a satellite telecommunications system that provides a great variety of services—including telephony, interactive television, video on-demand, Internet access, data communications, etc.—available on-demand, directly to the end user. The invented system combines low-cost user terminals with high system capacity, making the telecommunications system highly attractive to mass market usage. Moreover, all of these advantages are achieved without the need to rely upon well developed terrestrial telecommunications infrastructure.

SUMMARY OF THE INVENTION

A direct access satellite telecommunications system is described. The invented system employs one or more telecommunications satellites in geosynchronous orbit that provide radio frequency communication links for direct-to-premises (home, office, shop, etc.) telecommunications services across a geographical region of the planet. Relatively small user terminals located throughout the geographical region permit two-way telecommunications via user links provided by the one or more satellites. Separate access links, also provided by the satellites, are utilized to communicate with gateway stations located in the geographical region. The gateway stations may be coupled with terrestrial telecommunication networks, such as public switched telephone networks, public land mobile networks, or private networks.

A network control center manages the satellite resources. For example, bandwidth and power of the one or more satellites are allocated by the network control center. Because the gateways and the network control center both comprise relatively large stations, only a relatively small amount of satellite power is needed to provide the access links. This means that a majority of the satellite's power is dedicated to providing user links to the user terminals.

The present invention also includes additional features such as integration of the system into existing telecommunication systems infrastructure; a network architecture that enables integration with other satellite and terrestrial telecommunication systems; and innovative utilization of satellite bandwidth and power to enable flexible allocation to user and access link beams.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 3 shows the transponder flexibility for one embodiment of the present invention.

FIGS. 10A and 10B illustrate the frequency plan of the Extended C-Band uplinks and downlinks for one embodiment of the present invention.

FIGS. 11A and 11B illustrate the frequency plan of the X-Band uplinks and downlinks for one embodiment of the present invention.

DETAILED DESCRIPTION

The present invention is a pioneering advancement in the field of satellite-based telecommunications systems. The present invention provides the first ever public satellite telecommunications infrastructure by presenting a satellite system which offers a wide range of two-way interactive, multi-media services to small, inexpensive subscriber terminals. The range of services that the present invention can provide includes: digitally-encoded voice telephony; two-way data communication; facsimile; broadband Internet access; digitally-encoded broadcast services; pay-per-view television; and on-demand interactive video services (e.g., home shopping, video conferencing, etc.).

Although the following description includes many details applicable to specific embodiments of the invention, it should be understood that the basic architecture and techniques disclosed can be extended to a variety of different implementations and applications. By way of example, a telecommunications system is described that provides multimedia services to a region including Asia and Australia. The present invention, however can be applied around the globe to provide services in both developed and undeveloped regions of the world—irrespective of the existence of terrestrial telecommunications infrastructure.

For instance, the present invention offers great benefit to undeveloped regions such as Asia, Africa, Eastern Europe, or South America, where the vast majority of homes and businesses lack basic telecommunication wiring. In these regions, the present invention permits low-cost telephone and television services. In more developed areas, like Western Europe, North America and Japan, the present invention provides very high-speed, low-cost data telecommunications, Internet access, and interactive video services. Therefore, the detailed description which follows should not be considered as limiting the scope of the invention.

System Overview

Figure 1:
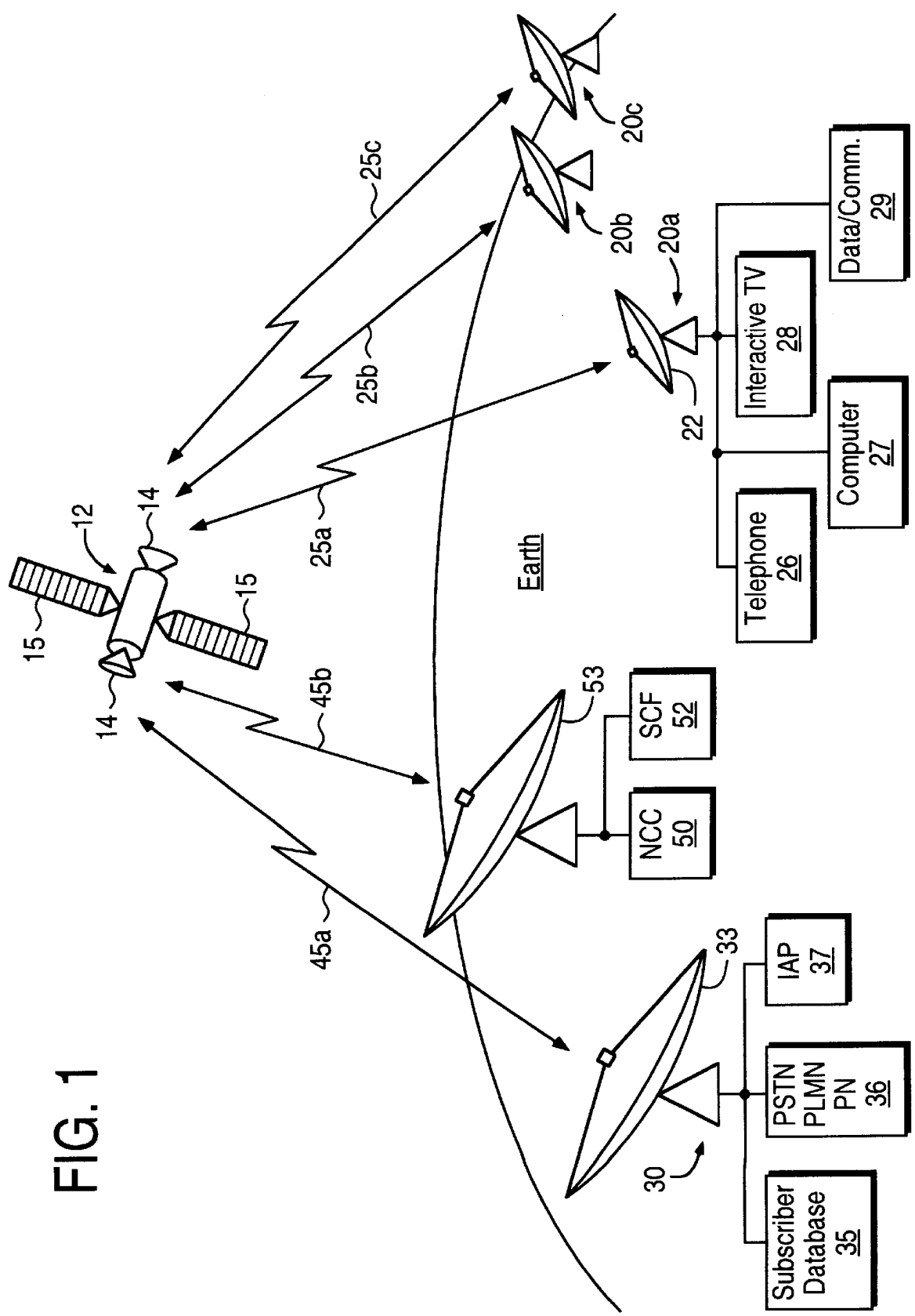
FIG. 1 illustrates the basic architecture of the direct access regional telecommunication system of the present invention.

With reference to FIG. 1, a conceptual diagram of the telecommunications system of the present invention is shown comprising a single telecommunications satellite 12 positioned in geosynchronous orbit (e.g., ~36,000 kilometers) above a geographical region of the Earth. Satellite 12 may be placed into orbit utilizing any of a variety of well-known launching methods. For example, U.S. Pat. No. 5,067,672 teaches one method of placing a geostationary telecommunications satellite in Earth-orbit. Techniques for stabilizing the attitude and orbital position of satellites are also commonly known, as exemplified by U.S. Pat. Nos. 5,279,483 and 5,508,932.

Satellite 12 comprises a high-power, high-sensitivity, three-axis stabilized satellite that is maintained in a fixed orbital location in the sky over the particular geographical region. A standard satellite control facility (SCF) 52 is employed to maintain the position and orientation of the satellite in space relative to the region. Satellite 12 utilizes standard solar panels 15 to generate power for the satellite's resources which includes a set of transponders 14 that provide telecommunications links—termed "uplinks" and "downlinks"—to Earth-based stations.

One of the functions of telecommunications satellite 12 is to provide single or multi-beam user links 25 that connect directly with user terminals 20 at user link frequencies. By way of example, FIG. 1 illustrates user terminals 20a–20c located at various user premises on the ground. The user terminals are typically located at a user's home, office or shop. Satellite 12 also provides single or multi-beam access links 45 that connect with gateway stations 30 and a network control center (NCC) 50 at access link frequencies. As will be explained in more detail shortly, the access and user link frequencies comprise different bands of the radio wave spectrum.

Satellite control facility 52 may either be integrated with or coupled to NCC 50, as shown in FIG. 1. Alternatively, SCF 52 may be remotely located from NCC 50 and communicate with satellite 12 via a separate access link. In FIG. 1, for example, both NCC 50 and SCF 52 are shown communicating with satellite 12 via access link 45b.

In the illustrated embodiment, each of the gateways 30 is coupled to a subscriber database 35 that stores user information. (Note that for simplicity purposes, only one gateway, 30a, is shown in FIG. 1.) This information may include a list of user locations, system configurations, billing information, etc. Across a wide geographic region, there are usually numerous gateways 30, distributed in a manner that permits each user terminal to be assigned a "home" gateway. The assignment of a home gateway to a particular user terminal may be based upon considerations such as proximity, ease of routing, cost factors, and so on.

One or more of the gateway stations 30 may also include a direct connection to terrestrial-based telecommunications networks. By way of example, gateway 30a is shown providing a direct connection to various land-based networks represented by block 36. These may include public switched telephone networks (PSTNs), public land mobile networks (PLMNs), and private networks (PNs). Additionally, gateway 30a may provide a high-speed, broadband connection that allows user terminals to access information available on the Internet. In the example of FIG. 1, this service is available via an Internet access point (IAP) 37 connection. Internet access point 37 may comprise a large fiber-optic cable link providing information access at an extremely high bandwidth (e.g., gigahertz).

One of the important architectural features of the satellite-based telecommunications system of the present invention is the use of relatively large gateway and NCC stations in combination with smaller, low-cost user terminals. As can be seen in FIG. 1, gateways 30 employs a relatively large antenna dish 33 for communications via access link beam 45a. Similarly, NCC 50 also utilizes a relatively large antenna dish 53 for communicating via access link beam 45b. Antennas 33 and 53 are typically on the order of 10.0 meters in diameter or larger. By making the gateway and NCC stations relatively large as compared to the user terminals, satellite power for providing access links 45 is minimized. This permits the majority of the satellite's power resources to be allocated to providing user links 25, which, in turn, makes possible the use of relatively small, inexpensive user terminals. It also enables full use of the user link spectrum by the user terminals. The innovative allocation of satellite bandwidth and power between user and access links is one of the salient features of the present invention.

In practice, several different types of user or subscriber terminals may be employed. In most instances, user terminals 20 utilize a relatively small antenna dish 22 having a diameter of between approximately 1.0– 2.0 meters (±0.2 m). Of course, larger, higher-powered antennas could also be utilized; albeit, at an increased cost to the end user.

In the example of FIG. 1, user terminal 20a is shown being coupled to a variety of multi-media devices. These include a telephone 26, computer 27, interactive television 28, and data telecommunications device 29. The particular type of user terminal employed and its configuration with other devices at the user's premises depends upon the desired range of services. In a specific implementation, user terminal 20a may comprise a 1.2 meter fully-interactive multi-media terminal with video reception and two-way telecommunication services via the satellite system. A simpler system may comprise a 1.2 meter telecommunications terminal with two-way digital voice telecommunications services via the satellite system. Yet another alternative is a very simple 1.0 meter or smaller terminal providing direct video reception from the satellite system with interactive video capability being provided through a fixed terminal link to a separate mobile satellite system, or a standard terrestrial network. Thus, the basic architecture of the present invention may be employed to advantageously provide a great variety of services to numerous different system configurations.

An interesting benefit of partitioning power and bandwidth between the gateways and user terminals is the capability of creating asymmetrical links. An asymmetrical link is created when unequal bandwidths (and/or power) are allocated between the forward link and return link of a telecommunication. For example, in the situation where a user requests on-demand Internet access through the satellite, there is usually be a huge amount of information (gigabytes) flowing in the forward link from the satellite to the user terminal, with very little information (kilobits) being sent via the return link. In response to such demands, the NCC can allocate a large information transfer bandwidth for the forward link, and, at the same time, allocate a narrow bandwidth for transmissions in the opposite direction (i.e., the return link). This dynamic allocation process, which is responsive to the on-going demands of the users, results in optimum usage of the satellite's resources.

Multi-Media Asia ($M^2A$) Implementation

One of the benefits of the present invention is the ability to locate user terminals 20 directly at the user's premises, thereby obviating the need for terrestrial cable lines or other traditional telecommunications infrastructure. As explained above, this is made possible by partitioning the satellite's resources such that most of the satellite's power is allocated to providing user links. This means that the invented telecommunications system can literally accommodate millions of users—each of which may request any of a broad range of services. According to one embodiment, a single geosynchronous telecommunications satellite provides user links to several million user terminals and several hundred gateway stations distributed throughout a geographical region. The entire system is controlled by a single network control center. Through the NCC, the system dynamically allocates bandwidth (i.e., transponders) to beams in a flexible and reconfigurable manner.

Figure 2:
FIG. 2 illustrates one example of the system of the present invention for a satellite providing system coverage of Asia and Australia.

The location of the satellite orbit, the user link and access link radio frequencies, and the user link and access link beam coverage are, of course, tailored to the particular region of system coverage to optimize performance, cost, and regulatory issues. With reference to FIG. 2, a particular implementation of the present invention is described. The system shown in FIG. 2 includes a single geosynchronous telecommunications satellite 12 placed in orbit at 118° E longitude. At this orbital position, satellite 12 provides multi-media system coverage for a geographical region which extends across Asia and Australia.

Satellite 12 provides user links into eight coverage beams at Extended C-Band radio frequencies. All of the user links are two-way, with the uplink (user-to-satellite) connection being provided in the frequency range of 6425–6725 MHz, and the downlink (satellite-to-user) connection being provided in the frequency range 3400–3700 MHz. A single beam access link is provided at X-Band radio frequencies in which the uplink frequency is in the 7900–8400 MHz and the "downlink" frequency range is 7250–7750 MHz. Each of the seven user link spot beams is aimed over a particular coverage area of the larger geographical region covered by the Asia beam. The Asia beam provides both user links and access links at Extended C-Band and X-Band frequencies, respectively.

It should be understood that the novel use of separate user links and access links allows optimized design of the links and enables the majority of the satellite resources to be devoted to the user links. This architecture provides numerous advantages not found in past systems. For example, the present invention allows users to be directly connected to each other (via user links only) and to other telecommunications networks, irrespective of user location or the existing telecommunications infrastructure.

Selection of Extended C-Band for the user links also provides benefits over the prior art. Extended C-Band frequencies permit small, low-power user terminals, good link conditions, and a large circuit capacity per satellite based on state-of-the-art satellite designs (10–12 kW). Whereas the problem known as "rain fade" is common in satellite telecommunications systems utilizing Ka-Band frequencies (~20–30 GHz) and Ku-Band frequencies (~10–20 GHz), with Extended C-Band this problem is virtually non-existent. Compared with the traditional telecommunications Standard C-Band frequencies, Extended C-Band also has less restrictive satellite power flux density limits, less adjacent satellite interference, and a full 300 MHz of uplink and downlink capacity.

The telecommunications system of the present invention takes full advantage of the Extended C-Band spectrum by devoting all of this frequency band to user links. In other words, access links are provided on a separate frequency band (i.e., X-Band) so as not to limit use of Extended C-Band by the small user terminals, which have a greater need for the advantageous operating conditions that it offers. Recall that according to the present invention, access links utilized large earth stations that do not require the valuable benefits that Extended C-Band offers. The use of access links therefore effectively doubles the number of circuits and user terminal that can be accommodated in the Extended C-Band spectrum. As already explained above, separate access links also allow independent optimization of satellite power resources for the user links and access links.

With continuing reference to FIG. 2, each of the spot beams is shown by a solid bold line that encloses the corresponding coverage area. Table I below lists each of the beams and the corresponding geographical coverage area.

TABLE I

| No. | Name | Coverage Area |
|---|---|---|
| 1 | INDO | Indonesia, Malaysia, Brunei |
| 2 | PHIL | Philippines and Guam |
| 3 | THAI | Thailand, Myanmar, Vietnam |
| 4 | INDI | India, Pakistan, Sri Lanka, Bangladesh, Bhutan, Nepal, and visible parts of the Middle East |
| 5 | CHNA | China, Hong Kong, Taiwan, Macao |
| 6 | JAKO | Japan, N. Korea, S. Korea |
| 7 | AUST | Australia |
| 8 | ASIA | Combined coverage of the seven beams above. |

A single X-Band access link beam provides identical coverage to the ASIA user link beam. The access links are designed to minimize satellite power resources by the use of 12.0 meter X-Band gateway stations. As previously discussed, this enables the majority of the satellite power to be dedicated to powering the Extended C-Band transponders, thereby permitting the use of low-cost 1.2 meter user terminals.

The spot beam transponders are specified as having a gain-to-noise temperature ratio (G/T) of at least +1 dB/° K per transponder. Saturated effective isotropic radiative power (EIRP) is specified to be at least 46 dBW per transponder. Spatial isolation between non-adjacent spot beam pairs is at least 15 dB for downlinks and 18 dB for uplinks.

Practitioners in the art will appreciate that spot beam transponders only need to be allocated to the same uplink and downlink beam. Routing from one spot beam uplink to another spot beam downlink is not required. This is because according to the architecture of the present invention, each satellite has a large beam which encompasses the coverage of all the spot beams. In the M²A system implementation, for instance, this large beam is the ASIA beam. The large ASIA beam provides universal connectivity of any earth station to any other earth station. This feature has utility for interstation signaling and messaging between individual gateways and between gateways and the NCC. It also enables direct connection between user terminals located in different spot beams, i. e., spot-to-spot routing. That is, there is no need for interbeam connectivity between spot beams in the telecommunications system of the present invention. Direct connections of this type could only be accomplished in past systems by means of a double satellite hop (involving long, annoying delays) or complex on-board satellite technology, as is typically required in handheld mobile satellite systems such as ACeS™, and in higher frequency Ku-Band and Ka-Band systems (such as Spaceway™).

Satellite frequency planning coverage is arranged to enable a four-fold frequency reuse of the 3400–3640 MHz (downlink) and 6425–6665 MHz (uplink) Extended C-Band frequencies by beams nos. 1–7. This is achieved through the use of both polarization and spatial signal isolation. This allows for a total of 24 spot beam transponders each with 36 MHz of useful bandwidth.

The remaining 6665–6725 MHz and 3640–3700 MHz portions of the Extended C-Band frequency bands are allocated to beam no. 8 and are reused twice through polarization isolation. This provides for 4 ASIA beam transponders each with 27 MHz of useful bandwidth within the frequency range 3640–3700 MHz (downlink) and 6665–6725 MHz (uplink). The four ASIA beam transponders have a saturated EIRP of at least 43 dBW per transponder. The G/T of each transponder is at least −5 dB/° K.

FIG. 3 illustrates the allocation matrix for the transponders according to the M²A system implementation of the present invention. The twenty-four spot beam transponders are split into two groups of twelve transponders and four spot beams. Note that for each group, individual spot beams may be flexibly allocated between zero and six transponders, up to a maximum of 12 transponders for the group. It is appreciated by having multiple coverage beams, the system of the present invention can reuse the frequency resources between the beams. This is because the beams are arranged in a pattern wherein each beam is effectively isolated between different coverage areas. Spatial beam-to-beam isolation of at least 15 dB for downlink and 18 dB for uplink between each of the pairs of beams marked by an "X" in Table II below is sufficient to provide effective isolation.

TABLE II

|  | INDO | THAI | PHIL | INDI | CHNA | JAKO | AUST |
|---|---|---|---|---|---|---|---|
| INDO |  |  |  | X | X | X |  |
| THAI |  |  |  |  |  | X | X |
| PHIL |  |  |  | X |  | X |  |
| INDI | X |  | X |  |  |  | X |
| CHNA | X |  |  |  |  |  | X |
| JAKO | X | X | X | X |  |  | X |
| AUST |  | X | X | X | X | X |  |

An additional two-fold increase is achieved from polarization reuse (vertical and horizontal). Thus, in 240 MHz of frequency spectrum, the present invention accommodates essentially 960 MHz (24 transponders with useful bandwidth of 36 MHz) of capacity through frequency and polarization reuse. Combined with two-fold frequency reuse and two-fold polarization reuse, the use of separate frequency bands for the user links and access links already described gives an effective reuse factor of eight for the Extended C-Band spectrum. This means that the 300 MHz Extended C-Band uplink and downlink spectrum can handle a system with a number of circuits that can accommodate 2400 MHz of raw spectrum!

As indicated in FIG. 3, the uplink and downlink signals are channelized into sixteen channels (eight per polarization). Channels 1V–6V and 1H–6H accommodate the twenty-four spot beam transponders and each have an operational bandwidth of 36 MHz. Channels 7V, 8V, 7H and 8H accommodate the four ASIA beam transponders, and each have an operational bandwidth of 27 MHz. The frequency plan of the M²A system for the Extended C-Band uplinks and downlinks is shown in FIGS. 10A and 10B, respectively. Similarly, the frequency plan for the X-Band uplinks and downlinks is shown in FIGS. 11A and 11B, respectively.

Practitioners in the art will appreciate that all Extended C-Band transponders may be independently cross-strapped with X-Band transponders in one of three modes: (1) X-Band uplink to Extended C-Band downlink, and Extended C-Band uplink to X-Band downlink; (2) Both X-Band and Extended C-Band uplinks to Extended C-Band downlinks, and Extended C-Band uplinks to both X-Band and Extended C-Band downlinks; and (3) Extended C-Band uplink to Extended C-Band downlink (no cross-strapping; X-Band unused).

Referring to FIGS. 10A and 10B, within each group, each beam may have anywhere between zero and six transponders allocated according to the demands of the users within the geographical region. That is, each transponder is capable of being allocated to an uplink beam and a downlink beam in a reconfigurable manner by ground command. The system thereby provides great transponder-to-beam allocation flexibility. However, as demand changes, the satellite's resources may be dynamically changed so that the collective satellite resources may be allocated according to where the greatest user demand lies. For instance, if demand increased in China or Japan, the number of transponders and power allocated to service these regions may increase at the expense of other coverage areas currently experiencing relatively lower demands.

Note that the dynamic allocation scheme of the present invention may rely upon a standard transponder hardware that typically includes channel and high-power amplifiers. In other words, the M²A system implementation thus described can be constructed using ordinary "off-the-shelf" hardware. (Each transponder has its own corresponding set of hardware.) This allows allocation of a piece of transponder hardware to a particular section of spectrum—with both being allocated to a particular beam.

Exemplary Operations

Figure 4A:
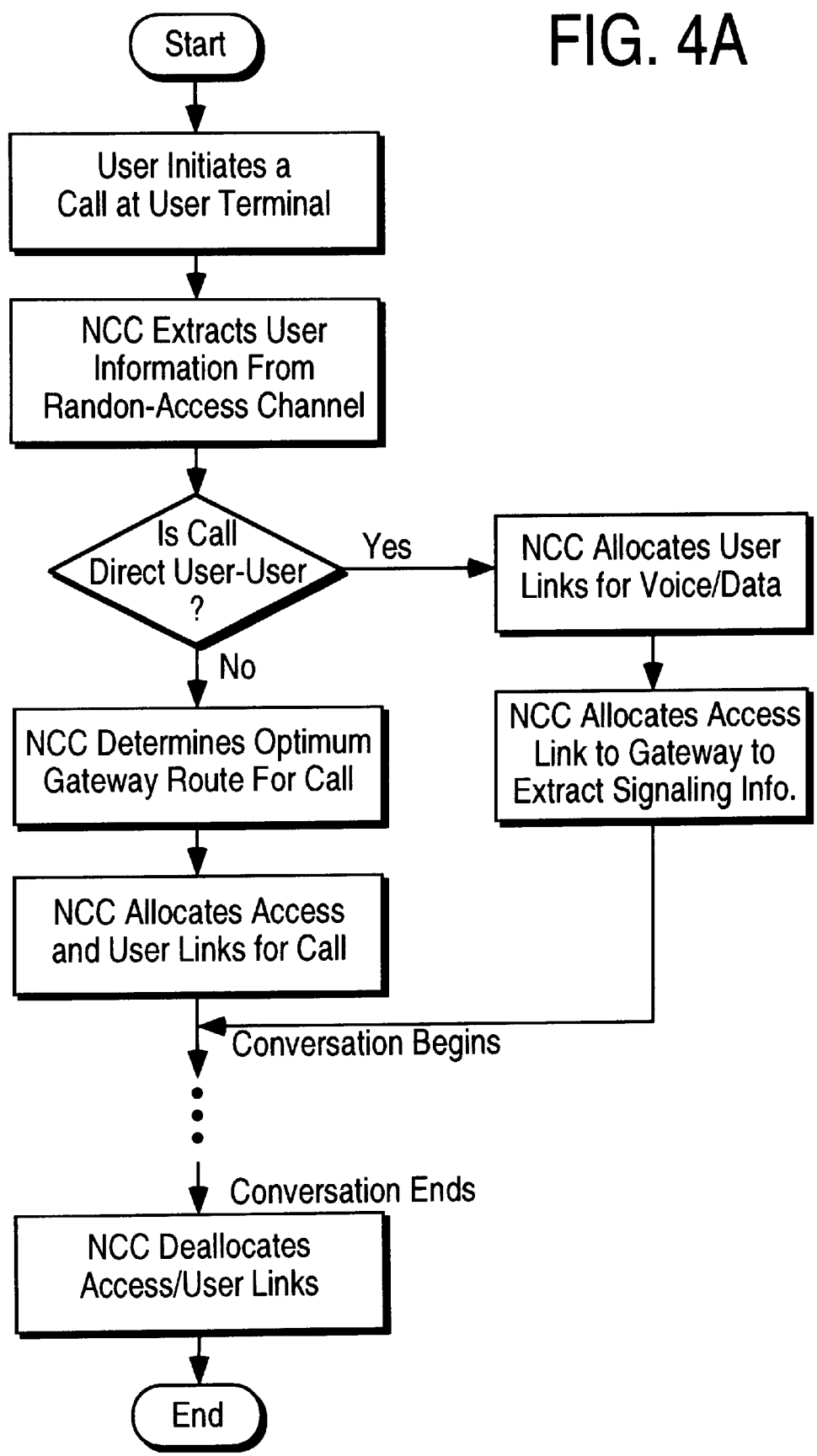
FIGS. 4A and 4B are flow diagrams showing examples of operation for one embodiment of the present invention.

To better understand the advantages and features of the present invention, several examples of the operation of an embodiment of the present invention will be described with reference to FIGS. 4A and 4B.

Consider an application of the present invention in which basic voice telecommunications are provided for a user in a geographical region. Assume that a user wishes to place a call either to another user, or to someone located outside the geographical region covered by the satellite system. This exemplary operation is illustrated by the flowchart of FIG. 4A. Block 201 of FIG. 4A shows the process beginning when the user lifts the telephone receiver to initiate a call at the user's home or office terminal. Dialing of the telephone number causes a signal to be transmitted from user terminal 20*a* to NCC 50 via satellite 12 (see FIG. 1). In this particular embodiment, each user terminal has a unique identification number and is also uniquely assigned to one particular gateway in the geographical region. This gateway is known as the user's "home" gateway. The user's identification number is included in the initial signal transmission from the user terminal. In this way, the NCC and any gateway that receives the signal immediately recognizes the user, and knows which gateway is the user's home gateway.

Random access channels are utilized by the user terminals to initiate calls. The initial signaling from the user terminal on the random access channel includes pertinent information about the user and the request being made. At all times, NCC 50 transmits common channel signaling which can be received by all user terminals. For a user-initiated call, the user's terminal monitors the common channel signaling received from NCC 50, and transmits a call request on the random access channel indicated by the common channel signaling. At this point, NCC 50 extracts user information from the random access channel, including the user's home gateway and the call destination. This step is represented in FIG. 4A by block 202.

From the derived user information, the NCC determines whether the call should be routed through the user's home gateway, through another gateway, or directly to another user (i.e., for user-user calls). Note that NCC 50 has access to subscriber database 35 associated with gateways 30 via access links 45. In this way, NCC 50 is able to ascertain whether the call is directly to another user within the geographical region covered by satellite 12 (i.e., a subscriber of the system) or to someone outside the region. This determination is represented by block 203.

NCC 50 is also able to determine the optimum route for the call, e.g., in terms of minimized call charges, circuit availability, designation connections, etc. For example, if the call is to be routed via the home gateway, then NCC 50 may signal the home gateway (e.g., 30*a*) to assume control over the call. Bandwidth and power are allocated by NCC 50 for establishing user link 25*a* and access link 45*a*, thereby enabling communications between the gateway and the user. In the event that the call is to be routed through a gateway other than the user's home gateway, NCC 50 will signal to the user's home gateway to forward the appropriate user information to the correct gateway. Basically, the user becomes a visitor at that gateway. Thereafter, the NCC may signal the visited gateway to take over control of the call. As before, NCC 50 allocates an access link and user link between the visited gateway and the user. These steps are represented in FIG. 4A by blocks 206 and 207.

For direct user-to-user calls, the voice/data information is routed directly between the two user terminals through user links only. For example, with reference to FIG. 1, a user-to-user call may be placed through user links 25*a* and 25*b*, thereby allowing a conversation to take place between individuals present at terminals 20*a* and 20*b*. Even in this situation, however, it should be understood that the initiating user's home gateway may assume control of the call in order to extract and insert certain signaling information (e.g., for billing purposes). Therefore, an access link is also allocated by NCC 50 for user-to-user calls to enable the gateway to extract certain information from the call, and also so that the gateway can insert whatever signaling information it needs to insert into the call. These steps are illustrated in FIG. 4A by blocks 204 and 205.

Once the various access links and user links have been established, the conversation may commence. After the conversation has ended and both parties hang up, NCC 50 deallocates the frequencies and power used to service the call. This enables those satellite resources to be used for servicing new requests. This step is represented by block 208 in FIG. 4A.

It should by understood that if a user initiates a call to someone who is located outside of the geographical coverage region, an appropriate gateway station provides the proper connection to the person receiving the call. By way of example, in the case where a user having a terminal located in Indonesia places a call to someone in the United States, the call may be routed through a gateway station having a direct connection to a PSTN in the United States. For instance, the call may be routed to a gateway located in Guam, which can provide a direct connection to the appropriate PSTN in the United States via a trans-Pacific underwater cable line.

Figure 4B:
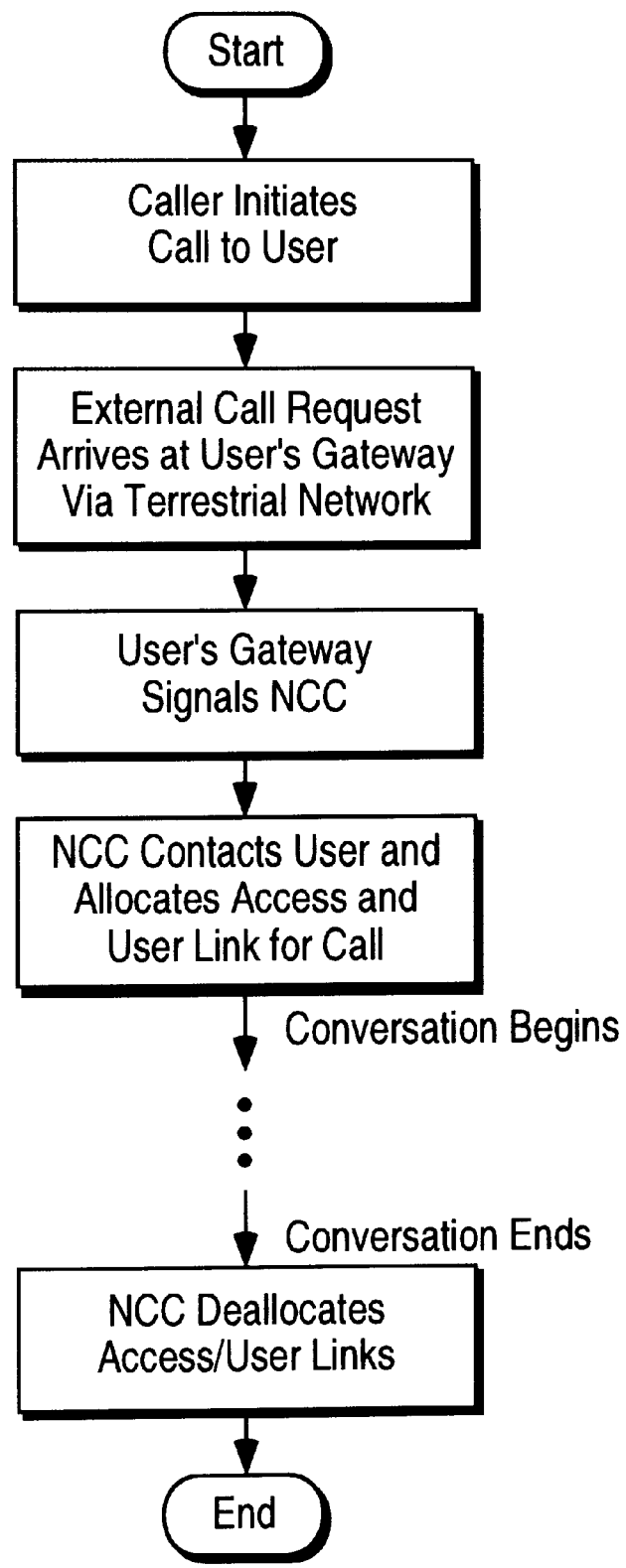

An example of an external call destined to a user is illustrated in the flowchart of FIG. 4B. In this situation, the process begins at block 401 wherein an outside (non-subscriber) caller initiates a telephone call to a user located in the geographical coverage region of satellite 12. Based on the dialed digits, the external call request will arrive at the user's home gateway, perhaps via a direct connection through an existing terrestrial network. This is shown in FIG. 4b by block 402. Information about the call designation is sent to the NCC 50, which responds by contacting the destination user on a paging channel. A user link and access link between the user and the gateway is than allocated for the call. These steps are represented in FIG. 4b by blocks 403 and 404.

Preferably, the allocated gateway should be the user's home gateway. But this may not provide the most optimum routing, depending upon the location of the external caller. It should be understood that the invented system enables allocation of an externally-initiated call to any one of a number of gateways for optimum routing to reduce call charges. However, since most existing terrestrial systems lack the capability to re-route a call to the optimally-located gateway, the default situation is to designate the user's home gateway for all externally initiated calls. As terrestrial networks improve, more optimized routing for externally-initiated calls may be supported by the system of the present invention. In other words, the basic architecture of the present invention has the flexibility to optimally route user calls, whether the destination is internal or external. Extending this feature to externally-initiated calls is considered within the scope of the present invention.

From the foregoing discussion, it is appreciated that the system allocates both satellite power and frequencies to establish access links and user links. Depending upon the exact resource management architecture of a particular implementation, this allocation may be performed by the NCC, or the NCC and the host gateway handling the service request. Frequencies are allocated by monitoring current usage of available frequencies, and then selecting appropriate available frequencies. Likewise, power is allocated by monitoring the current usage of available satellite power and then selecting an appropriate allocation of the available power to service a particular request. These allocations are accomplished by signaling to the gateway, satellite, and user terminal the respective transmit and receive frequencies, as well as the power output levels.

Multi-Satellite Systems

The embodiments discussed thus far can be implemented utilizing a single satellite launched into geosynchronous orbit, with the gateways and user terminals being located anywhere within the satellite coverage footprint. The present invention, however, may utilize multiple satellites to increase system capacity.

Figure 5:
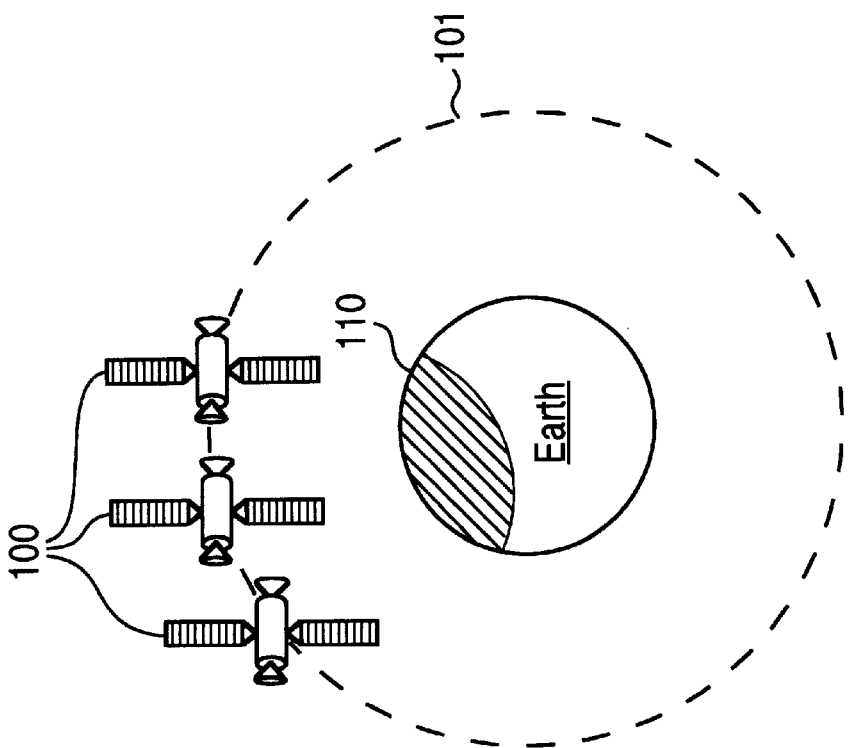
FIG. 5 illustrates the use of a satellite constellation for increasing user capacity over a single geographical region.

FIG. 5 illustrates a satellite constellation 100 comprising three satellites, each in geosynchronous orbit 101, providing coverage over a geographical region 110 of the Earth. The additional satellites provide more service-handling capacity over the same coverage region, thereby increasing the total number of users within the system. The same basic architecture described previously can be applied to the system of FIG. 5. The satellite control facility (SCF), however, should be designed with broadband equipment for simultaneous control of the separately located satellites. In addition, separation between the satellites (somewhere in the range of 2 to 6 degrees) should be maintained to avoid signal interference.

In a system employing a constellation of satellites there are many ways to take advantage of the increased capacity. For example, groups of users may be assigned to a particular satellite in a manner that divides the total number of users among the individual satellites. Alternatively, the gateways, user terminals, and NCC/SCF stations may include standard mechanical assemblies to change the focus direction of the satellite antenna dish. In such a system, the individual stations or terminals could be steered to any one of the plurality of satellites which comprise the constellation.

Figure 7:
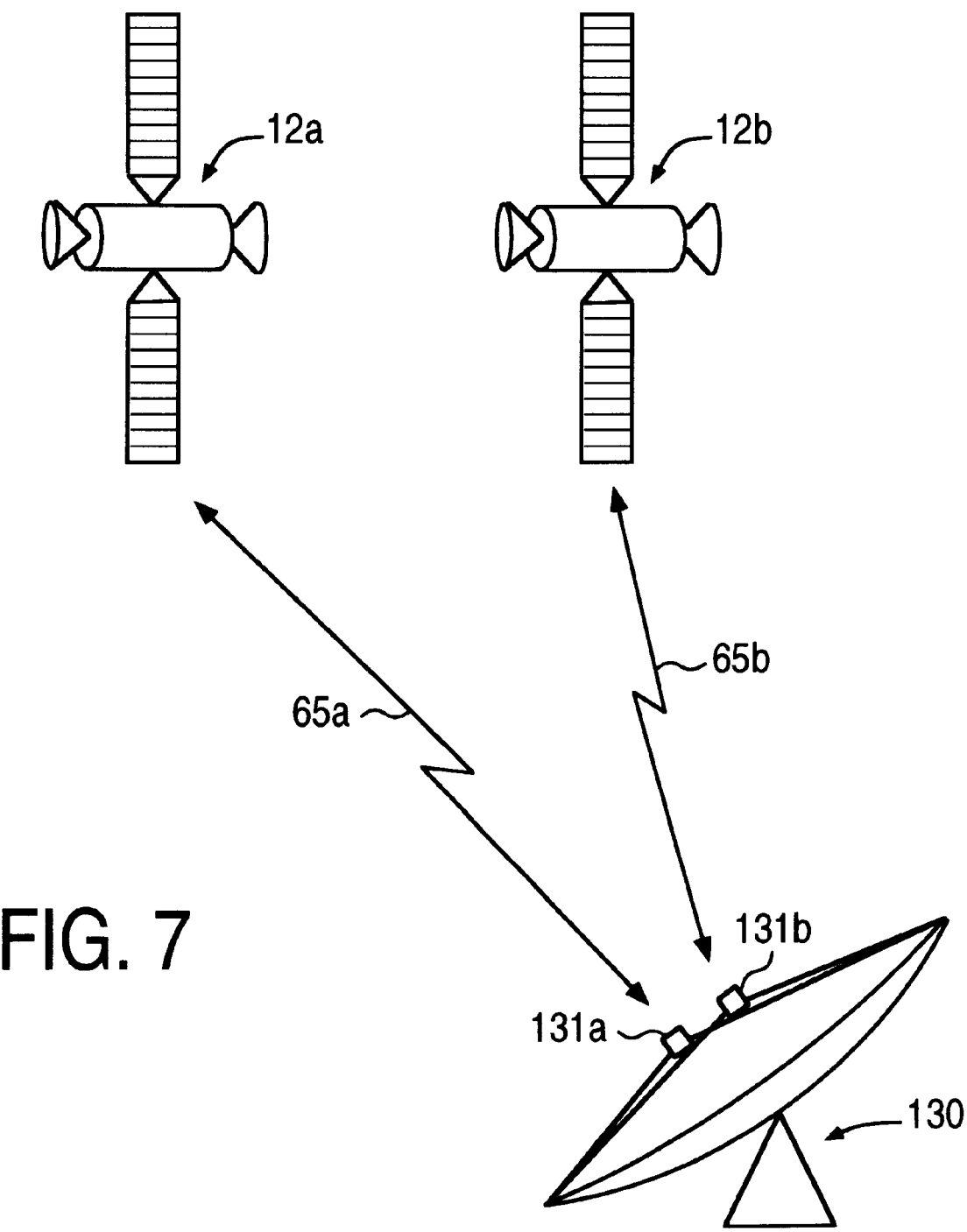
FIG. 7 illustrates link beams to multiple satellites from a single station in accordance with one embodiment of the present invention.

Yet another alternative is shown in FIG. 7, wherein a station or terminal 130 includes separate feed horns 131a and 131b. Feedhorn 131a directs communications to satellite 12a via two-way communications link 65a, while feed horn 131b directs two-way communications to satellite 12b via a link 65b. This arrangement allows communications from a single station or terminal to multiple satellites simply be switching between feed horns. Of course, other embodiments, such as more elaborate phased-array schemes, may be employed in a system employing a constellation of satellites.

Figure 6:
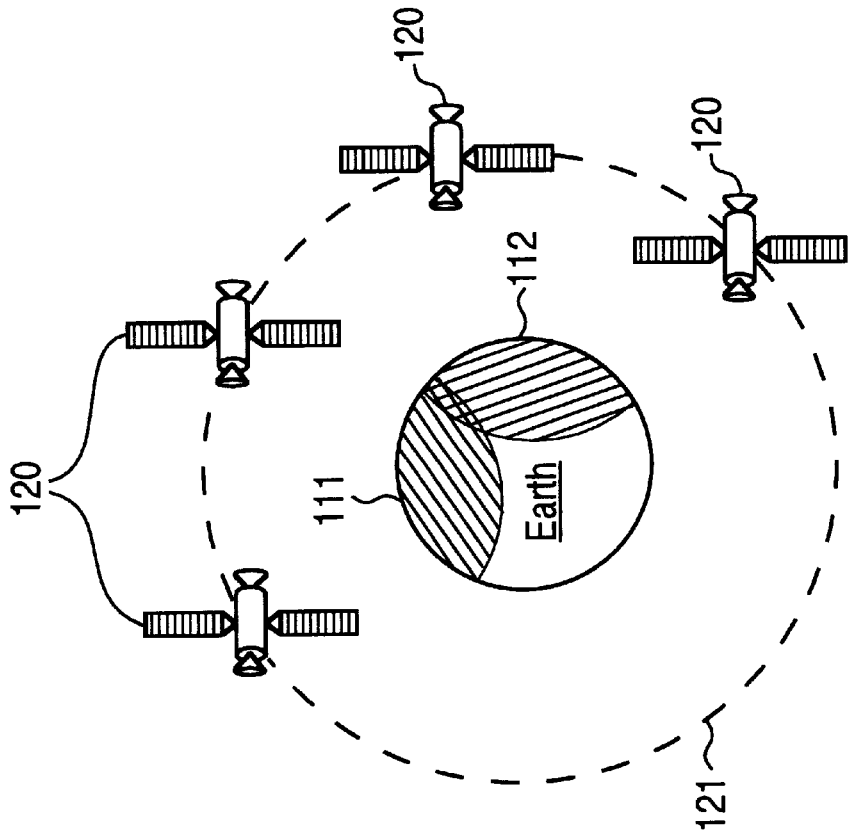
FIG. 6 shows the use of a satellite constellation that provides coverage for several regions of the globe.

FIG. 6 illustrates a satellite constellation 120 providing extended coverage over multiple geographical regions of the Earth. Each of the satellites 120 is in a geosynchronous orbit 121 over the Earth. The satellites in group 120a, however, are located over, and provide service to, geographical region 111. Group 120b provides similar services over geographical region 112. In the embodiment of FIG. 6, gateway stations and/or user terminals located in region 113 (represented by the intersecting area of regions 111 and 112) may communicate with satellites in both groups 120a and 120b. Hence, a great variety of telecommunications services may be provided to users extending over multiple geographical regions of the Earth.

A System Integrated with Mobile Cellular Satellite Service

Given that satellite-based mobile telephone systems are now in existence (or shortly will be) the present invention permits integration of the fixed satellite system described above with mobile cellular telephone services. For example, a subscriber to the $M^2A$ system may have a user terminal that provides multi-media services at the user's premises, but that user may also rely upon a mobile cellular telephone satellite-based system when traveling (i.e., roaming) away from the home, office, or shop. In this scenario, a single telephone number—perhaps more appropriately denoted a "user identification number"—may be used to access both the fixed and mobile systems. This goal is realized by the integrated satellite-based system of FIG. 12 which includes the integrated gateway and NCC stations shown in FIGS. 8 and 9, respectively.

Figure 12:
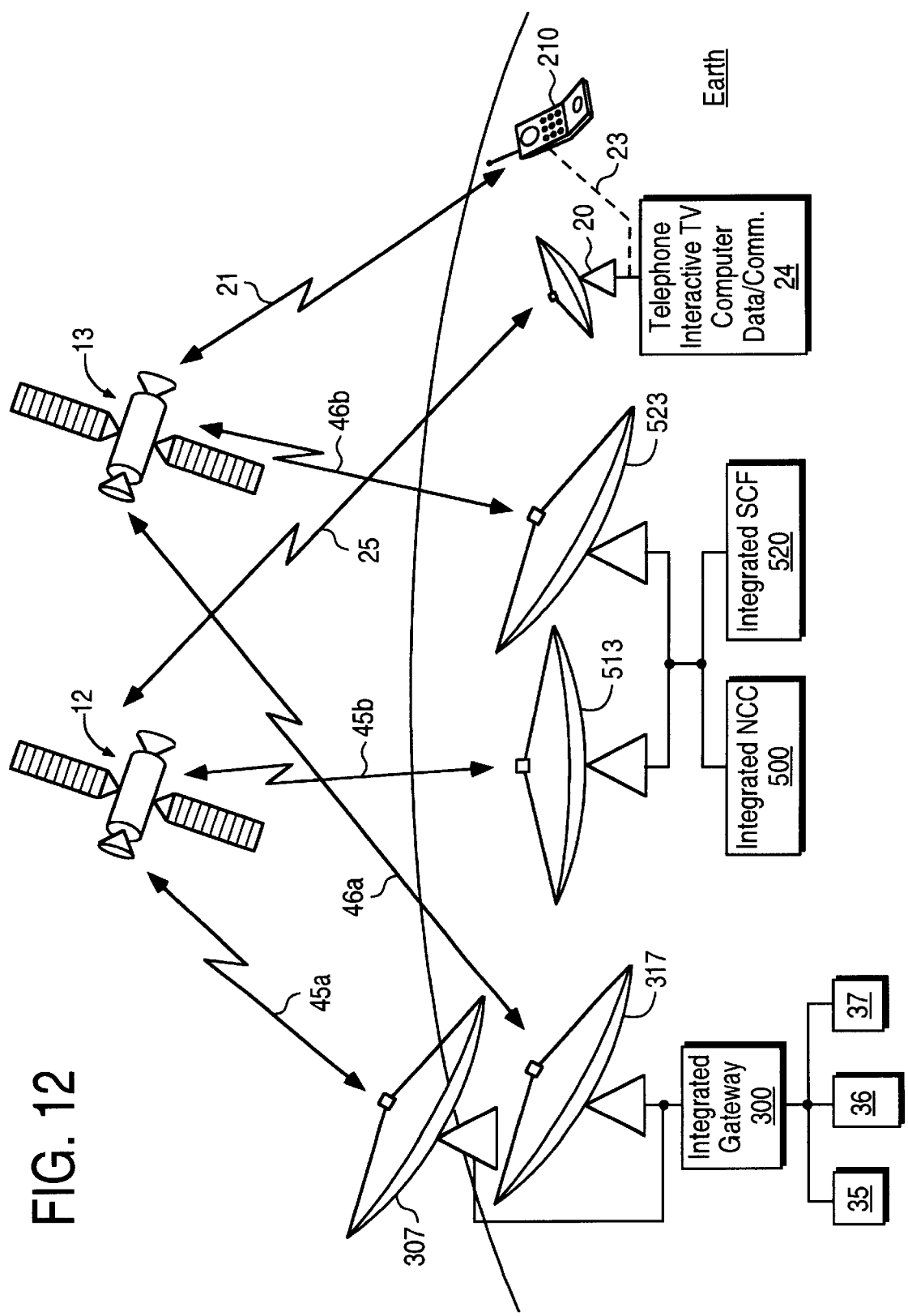
FIG. 12 illustrates the basic architecture of a telecommunication system which integrates mobile and fixed services.

FIG. 12 shows satellites 12 and 13 in geosynchronous orbit providing fixed and mobile satellite services, respectively, in an integrated telecommunications system. Satellite 12 is utilized to provide the fixed services described in connection with the system of FIG. 1. Satellite 13, on the other hand, is a mobile service satellite. FIG. 12 also shows a X-Band link 45a and an Extended C-Band link 46a being provided by satellites 12 and 13, respectively, to an integrated gateway 300 via respective antennas 307 and 317. The structure of gateway 300 (shown in detail in FIG. 8) includes connections to various land-based networks represented by block 36, IAP 37, and database 35. Similarly, X-Band link 45b and Extended C-Band link 46b are provided by satellites 12 and 13, respectively, to an integrated NCC 500 (and SCF 520) via respective antennas 513 and 523. Details of NCC 500 are discussed below in connection with FIG. 9.

As explained previously, a user terminal 20 may receive a variety of telecommunications services via Extended C-Band link 25 provided by satellite 12. By way of example, user equipment for these services is represented in FIG. 12 by block 24; it includes telephone, interactive television, computer, and data/communications. In addition, the integrated system of FIG. 12 permits mobile cellular telephone service using the same subscriber identification number associated with user terminal 20. Dashed line 23 denotes the common subscriber identification number shared by user terminal 20 and mobile satellite phone 210. Telecommunications link 21 between mobile service satellite 13 and phone 210 may comprise a L-Band frequency link, or any other similarly suitable frequency band link.

Figure 8:
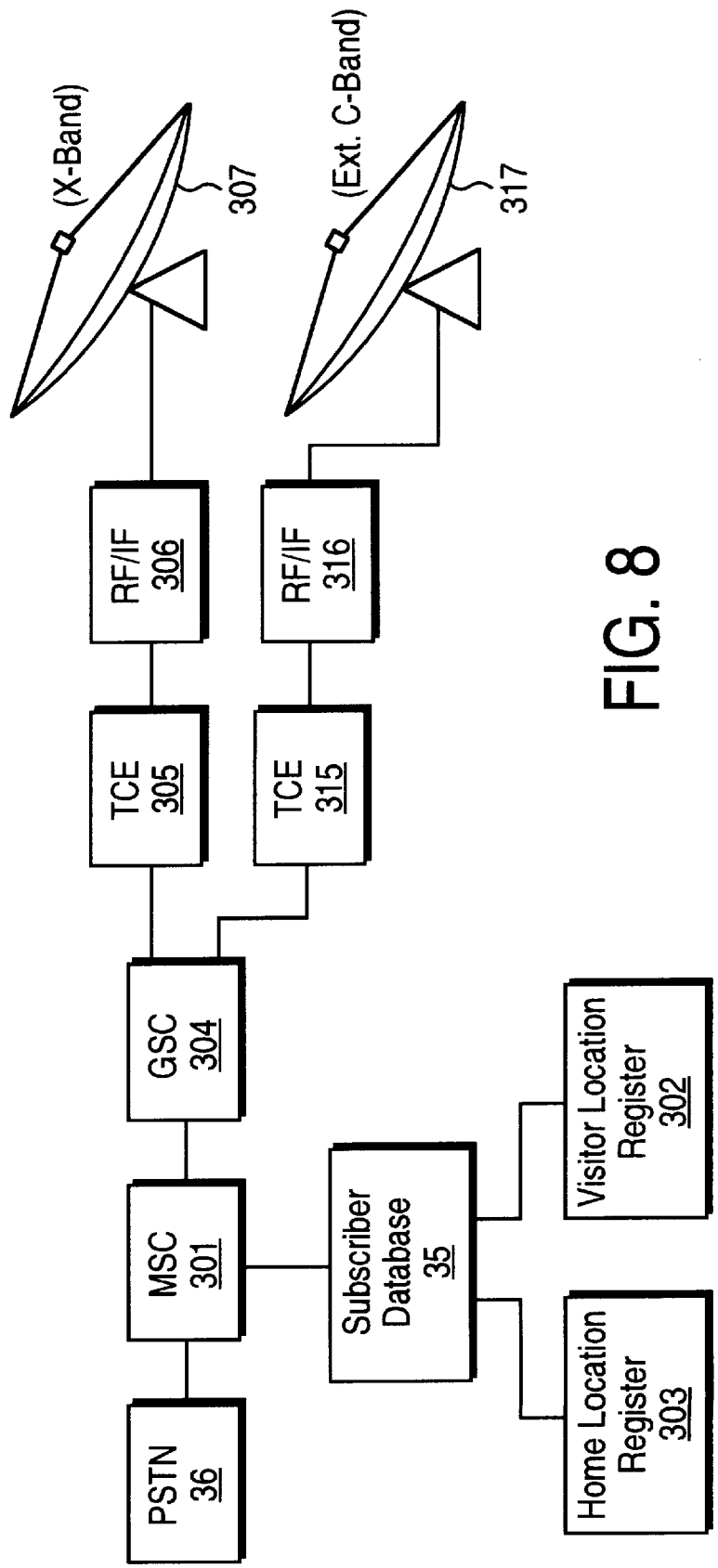
FIG. 8 is a block diagram of a ground station integrating mobile and fixed systems.

With reference to FIG. 8, details of the integrated gateway 300 shown in FIG. 12 are illustrated. Integrated gateway 300 combines satellite-based fixed and mobile services such that telephone numbers, subscriber information, routing plans, etc., are integrated in a seamless fashion. In such an integrated system, a call can be placed to a user through a single, dialed number and a connection made to either the user terminal or mobile telephone, obviating the need for the caller to know where the callee is physically located.

The gateway architecture of FIG. 8 includes a mobile switching center (MSC) 301 which comprises an ordinary part of a mobile cellular system. MSC 301 interfaces with PSTN 36 and also with a gateway station controller (GSC) 304. GSC 304 controls the allocation of the traffic circuits assigned to different calls. In addition, GSC 304 controls the interface with MSC 301. As shown in FIG. 8, MSC 301 has access to subscriber database 35 which stores fixed and mobile subscriber data.

Coupled to, or included within, database 35 are home and visitor location registers 303 and 302, respectively. Home register 303 stores home subscriber information; that is, information pertaining to users to which the particular gateway acts as a home gateway. The visitor register 302 contains information pertaining to those users who are visiting the gateway due to the particular routing of the call.

As explained above, GSC 304 interfaces with MSC 301 to route calls to the appropriate hardware, i.e., fixed or mobile satellites. For example, GSC 304 is shown coupled to traffic channel equipment (TCE) 304, which, in turn, is coupled to radio frequency/intermediate frequency (RF/IF) driver block 306 that provides the power and drive capability to antenna dish 307. Similarly, GSC 304 is also coupled to TCE 315 and RF/IF block 316 for driving antenna dish 317. In the embodiment of FIG. 8, antenna dish 307 utilizes X-Band frequencies for telecommunications via the fixed system. On the other hand, antenna dish 317 provides signaling in the Extended C-Band frequency range, which, for this particular implementation, is utilized for telecommunications via the mobile service satellite.

Figure 9:
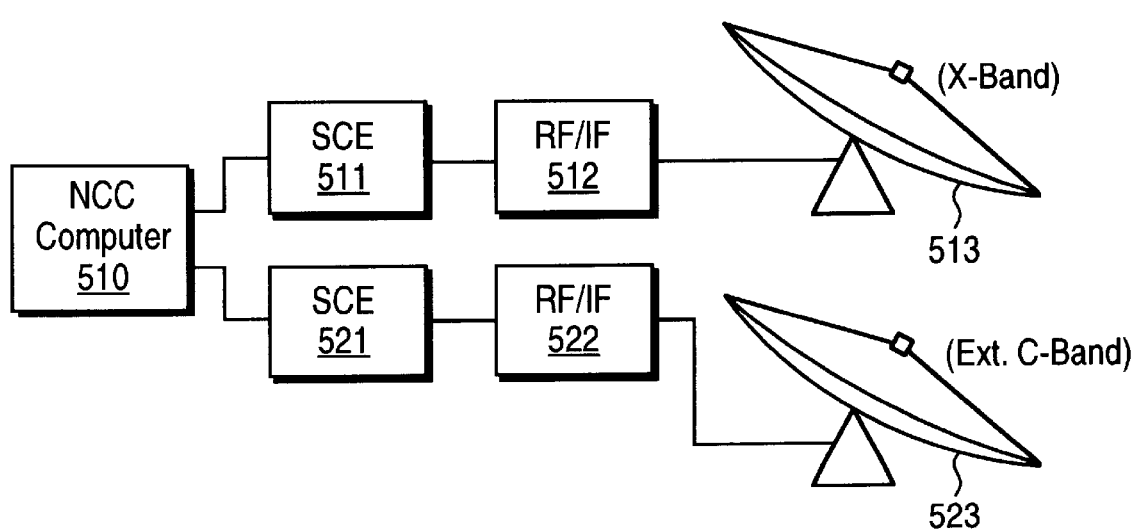
FIG. 9 is a block diagram illustrating the architecture of a network control facility for the embodiment of FIG. 8.

FIG. 9 is a block diagram illustrating the architecture of integrated NCC station 500 for a system that integrates both fixed and mobile satellite services. Integrated NCC 500 comprises a computer 510 that controls operation of the NCC. Computer 510, for example, controls signaling channel equipment (SCE) 511 and RF/IF 512 to drive antenna dish 513 when communicating with the fixed satellite 12 via X-Band frequencies. Similarly, computer 510 utilizes SCE 521 and RF/IF 522 to drive antenna dish 523 when communicating with the mobile satellite 13 via Extended C-Band frequencies. In this way, the NCC may establish the appropriate signaling channels for either the mobile or fixed services when setting up or tearing down a telephone call to or from a user terminal.

An integrated SCF 520 is also shown coupled to antennas 513 and 523. Integrated SCF 520 provides standard control signals to both satellites 12 and 13 in the same manner as described in connection with the system of FIG. 1.

Another major advantage of integrating a fixed telecommunications system with a mobile system (e.g., ACeS™) is that many of the elements developed for the mobile architecture can be reused or applied to the fixed system. For instance, existing cellular terrestrial systems employ network elements that include air interface techniques, switching centers, and voice coding techniques. In an integrated system comprising the fixed satellite system architecture described above, these well-developed mobile satellite system technologies can be advantageously applied in a novel way to provide significant cost savings. Other advantages of the integration of mobile and fixed systems include the ability to integrate services between the two networks; the ability to have a single telephone number for the two networks; and the ability to have a single billing system with a single, unified bill for the two networks. Thus, the integrated satellite-based telecommunications system of the present invention—which includes the structures of FIGS. 8 & 9 and the satellite architecture of FIG. 12—represents the world's first fixed cellular satellite telecommunications system.

We claim:

1. A satellite-based telecommunications system comprising:

a satellite in geosynchronous orbit providing satellite coverage over a geographical region;

a plurality of user terminals located in the geographical region, each having a relatively small antenna that permits two-way telecommunications with the satellite via user links;

a gateway station located in the geographical region coupled to a terrestrial telecommunications network, the gateway station having a relatively large antenna that permits two-way telecommunications with the satellite via access links;

a network control center (NCC) that controls the satellite, the NCC having a relatively large antenna, bandwidth and power of the satellite being allocated by the NCC such that a majority of the satellite's power is used to provide the user links, and a minority of the satellite's power is used to provide the access links.

2. The system of claim 1 wherein the relatively small antenna comprises a satellite dish having a diameter of between approximately 1.0 and 2.0 meters.

3. The system of claim 2 wherein the diameter of the relatively small antenna is approximately 1.2 meters.

4. The system of claim 2 wherein the relatively large antennas of both the NCC and the gateway station have a diameter of greater than approximately 10.0 meters.

5. The system of claim 4 wherein the relatively large antennas of both the NCC and the gateway station have a diameter of approximately 12.0 meters.

6. The system of claim 4 wherein the gateway station includes a database that stores user information, including user terminal locations.

7. The system of claim 1 wherein the geographical region comprises a plurality of geographical coverage areas, each of which is covered by at least one transponder.

8. The system of claim 7 wherein the user links utilize Extended C-Band frequencies.

9. The system of claim 8 wherein the access links utilize X-Band frequencies.

10. The system of claim 1 further comprising an Internet access point (IAP) connected at the gateway station, the IAP providing Internet access to a user terminal through a satellite.

11. The system of claim 1 wherein the satellite is one of a plurality of satellites in a satellite constellation that provides increased telecommunications capacity in the geographical region.

12. The system of claim 1, wherein the network control center dynamically allocates bandwidth in response to demands of a user.

13. A system for providing direct-to-premises telecommunications services comprising:
one or more telecommunication satellites in geosynchronous orbit that provide two-way radio frequency communication links, comprising access and user links, over a geographical region;
a plurality of gateway stations, at least one of which is connected to a terrestrial telecommunications network, the gateway stations having access to a database that stores user information, a gateway station communicating through the satellites via access links at X-Band radio frequencies;
a plurality of user terminals, each of which is located at a user premises, the user terminals communicating through the satellites via user links at Extended C-Band frequencies;
a network control center (NCC) that controls the satellites,
wherein a service request from either a user within the system or a terminal within the terrestrial telecommunications network causes the NCC to allocate bandwidth and power of a satellite to establish the access and user links.

14. The system of claim 13 wherein the satellites provide the user links utilizing a set of coverage beams, each coverage beam being primarily directed over a different area of the geographical region.

15. The system of claim 14 wherein a single one of the coverage beams covers all of the geographical region.

16. The system of claim 14 wherein the NCC implements a frequency plan that, combined with the set of coverage beams, enables four-fold frequency reuse of the Extended C-Band frequencies.

17. The system of claim 13 wherein the gateway stations and the NCC each comprise a large antenna.

18. The system of claim 17 wherein the large antenna comprises a dish having a diameter of at least 10.0 meters.

19. The system of claim 17 wherein the user terminals each comprise a small antenna.

20. The system of claim 19 wherein the small antenna comprises a dish having a diameter of between approximately 1.0–2.0 meters.

21. The system of claim 13 wherein the service request may include telephone, computer, television, or data telecommunications.

22. The system of claim 21 further comprising an Internet access point (IAP) connected at least one of the gateway stations, the IAP providing Internet access to a user terminal through a satellite.

* * * * *